United States Patent
Winkler

(10) Patent No.: US 12,479,658 B2
(45) Date of Patent: Nov. 25, 2025

(54) GOODS-STORAGE AND ORDER-FULFILLMENT SYSTEM

(71) Applicant: Dematic GmbH, Heusenstamm (DE)

(72) Inventor: Max Winkler, Graz (AT)

(73) Assignee: Dematic GmbH, Heusenstamm (DE)

( * ) Notice: Subject to any disclaimer, the term of this patent is extended or adjusted under 35 U.S.C. 154(b) by 395 days.

(21) Appl. No.: 18/001,362

(22) PCT Filed: May 31, 2021

(86) PCT No.: PCT/EP2021/064560
§ 371 (c)(1),
(2) Date: Dec. 9, 2022

(87) PCT Pub. No.: WO2021/249810
PCT Pub. Date: Dec. 16, 2021

(65) Prior Publication Data
US 2023/0242338 A1 Aug. 3, 2023

(30) Foreign Application Priority Data
Jun. 12, 2020 (DE) .......................... 102020115619.7

(51) Int. Cl.
*B65G 1/04* (2006.01)
*B65G 1/10* (2006.01)
(Continued)

(52) U.S. Cl.
CPC ............. *B65G 1/0407* (2013.01); *B65G 1/10* (2013.01); *B65G 1/1373* (2013.01); *B65G 61/00* (2013.01); *B65G 2207/30* (2013.01)

(58) Field of Classification Search
CPC .. B65G 1/0407; B65G 1/0414; B65G 1/1378; B65G 1/1373; B65G 1/10; B65G 2207/30; B65D 1/34
See application file for complete search history.

(56) References Cited

U.S. PATENT DOCUMENTS 5,564,890 A * 10/1996 Knudsen, Jr. ........ B65G 1/1373
414/807
10,022,867 B2 * 7/2018 Saboo ..................... G06Q 10/08
(Continued)

FOREIGN PATENT DOCUMENTS

DE 19612015 A1 9/1997
DE 19734916 A1 5/1998
(Continued)

OTHER PUBLICATIONS

Preliminary Report on Patentability of the International Searching Authority in English from corresponding Patent Cooperation Treaty (PCT) Application No. PCT/EP2021/064560, issued Dec. 13, 2022.
(Continued)

*Primary Examiner* — Kaitlin S Joerger
(74) *Attorney, Agent, or Firm* — Gardner, Linn, Burkhart & Ondersma LLP

(57) ABSTRACT

A goods-storage and order-fulfillment system having a rack store consisting of stackable rack units forming a multi-level shelving rack, with each shelf configured to store a plurality of articles, and including an automated depositing and retrieving machine that has its own travel drive and is automatically controlled and contactlessly guided for depositing trays or articles into and/or retrieving the same from the shelving racks. The system includes an automated transport unit for receiving articles from or transferring articles to the depositing and retrieving machine to transport an individual article unloaded from the tray to a picking station or to transfer an individual article to the tray or to the machine, the transport unit being floor-bound and having its own travel drive and being automatically controlled and contactlessly guided. The system includes at least one picking station supplied with individual articles by the transport unit for at least partial order fulfillment.

20 Claims, 8 Drawing Sheets

(51) Int. Cl.
*B65G 1/137* (2006.01)
*B65G 61/00* (2006.01)

(56) References Cited

U.S. PATENT DOCUMENTS

| | | | |
|---|---|---|---|
| 10,351,346 B2* | 7/2019 | Otto | B65G 1/1378 |
| 2017/0166399 A1 | 6/2017 | Stubbs et al. | |
| 2017/0203921 A1* | 7/2017 | Issing | B65G 1/0407 |
| 2018/0134508 A1 | 5/2018 | Buell et al. | |
| 2020/0317444 A1* | 10/2020 | Zitzmann | G01G 19/00 |
| 2024/0391101 A1* | 11/2024 | Li | B25J 9/1697 |

FOREIGN PATENT DOCUMENTS

| | | |
|---|---|---|
| DE | 102008022323 A1 | 11/2009 |
| DE | 10201400834 A1 | 12/2011 |
| DE | 102014008341 A1 | 12/2011 |
| DE | 102014111385 A1 | 2/2016 |
| DE | 102015114393 A1 | 3/2017 |
| DE | 102017130577 A1 | 6/2019 |
| EP | 1590272 A2 | 11/2005 |
| EP | 2353778 A2 | 8/2011 |
| EP | 3127837 A2 | 2/2018 |

OTHER PUBLICATIONS

International Search Report and Written Opinion of the International Searching Authority in English from corresponding Patent Cooperation Treaty (PCT) Application No. PCT/EP2021/064560, indicated completed on Sep. 2, 2021.

* cited by examiner

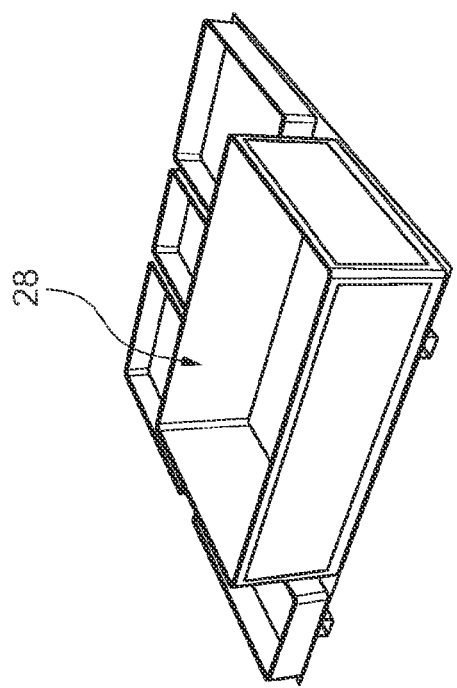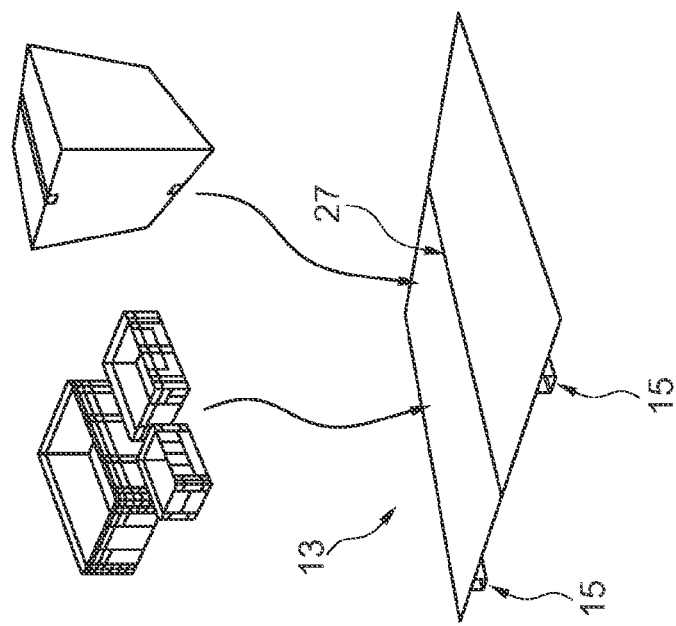
Fig. 5

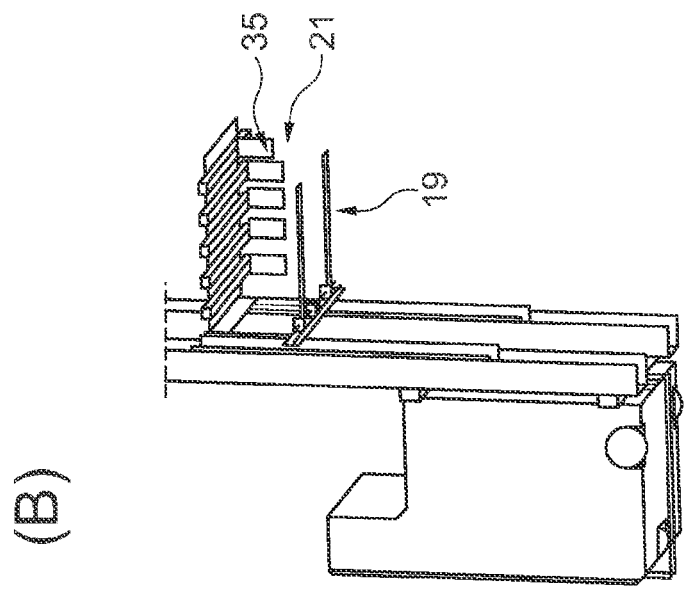
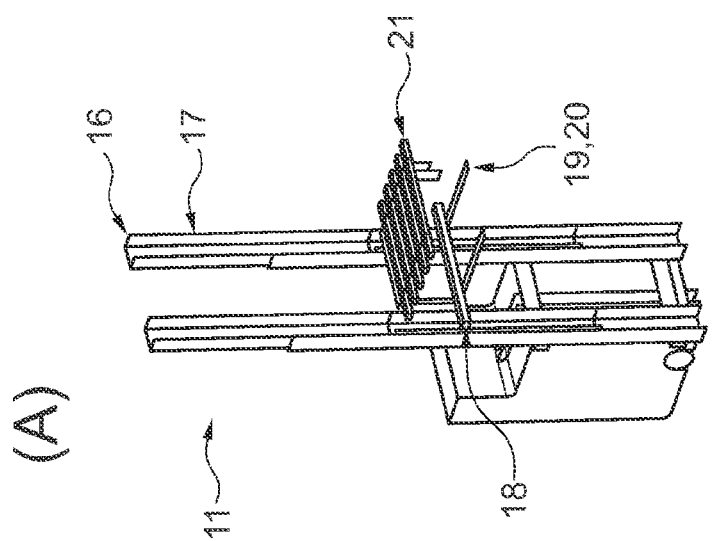
Fig. 6

GOODS-STORAGE AND ORDER-FULFILLMENT SYSTEM

CROSS REFERENCE TO RELATED APPLICATION

The present application claims the priority benefits of International Patent Application No. PCT/EP2021/064560, filed May 31, 2021, and claims benefit of German patent application no. DE 10 2020 115 619.7, filed on Jun. 12, 2020.

BACKGROUND AND FIELD OF THE INVENTION

The invention relates to a goods-storage and order-fulfillment system.

The use of goods stores for the storage of articles for use in order processing is known. A distinction is normally made between high-level rack stores and automated small-item stores or shelved rack stores which both have the common feature that they comprise fixedly installed and therefore preset structures. Therefore, in order to design these, it is necessary to know how the maximum requirement for storage surface area, throughput etc. will be and how this changes during operation in order to allow for optimised design during construction, since this cannot readily be changed at a later date.

In addition, stores with mobile racks from the company Kiva are also known. Thus, e.g. EP 1 590 272 A2 describes a system for store and stock management in a warehouse, comprising one or more mobile drive units and a plurality of movable storage pods, wherein each movable storage pod, as a rack-like construction, contains articles and is designed for attachment via a coupling mechanism to the mobile drive units, wherein the mobile drive unit is coupled to a movable storage pod and raises same in order to transport the movable storage pod, in response to the command signals, through the warehouse to picking stations where picking directly from the storage pods is carried out.

Such a system is quick to implement in a goods store and can be scaled effectively in order to increase performance if required.

However, it makes poor use of space and the mobile storage pods are ergonomically disadvantageous since the articles contained in the storage pods are disposed at a very wide range of levels/heights and the picker needs to stoop and/or stretch or even use a ladder to reach all the articles. In addition, filling of the storage pods is troublesome.

In addition, mixed forms are known, in which mobile racks are combined with fixedly installed infrastructure. Thus, EP 2 353 778 A2 discloses a storage rack for storing and transferring tools for use in a machine tool. The storage rack is provided with at least one rack module with a large number of shelves, wherein each shelf can be assigned a laterally insertable receiving device, and wherein each receiving device comprises at least one tool receiver construction for secure deposition of a tool. It further comprises a lifting unit for receiving a receiving device pushed out from the shelf and for vertically displacing the receiving device, and a transfer unit for receipt/delivery of the tool from/to the receiving device and for further handling of the tool.

US 2018/0134508 A1 also describes an automated mechanical loading system for loading seedling carriers into a transporter bin for transport to the field for planting. The system comprises a transporter bin with a large number of rails which are mounted on the inside walls of the bin in order to receive a large number of carriers, and power-driven projections, which are displaceably mounted on sleds which are fixedly mounted on the top frame of a lift in order to press one or more carriers into a preselected set of opposing rails in the bin. The lift controls the height of the sled so that the carriers are pressed into the preselected rail set in the bin. A mechanically referenced coupler is provided for fastening the lift to the bin in order to limit the movement of the lift relative to the bin into which the seedling carriers are to be loaded during the automated loading process.

SUMMARY OF THE INVENTION

The present invention provides a system for store and stock management in a warehouse, which includes improved use of space and is at the same time more ergonomic.

In accordance with the invention it has been recognized that, if a system is implemented without mobile racks as storage pods but combines freely erectable racks with removable trays or simple shelves for the articles with automated depositing and retrieving machines for depositing and/or retrieving the trays or articles into or out of the shelves and with at least one automated transport unit for receiving or transferring articles from or to the depositing and retrieving machine and with at least one picking station, it is possible to link the variability and scalability of the mobile storage pods of the Kiva system with improved use of space and ergonomics.

In particular, the invention can overcome the three substantial disadvantages of the Kiva system, which in that case would be i) poor use of space owing to the low height of the mobile storage pods or racks; ii) poor ergonomics since the picker must stoop or stretch (articles of heights between 40 cm and 2 m can be stored in the storage pod compartments); iii) troublesome and therefore cost-intensive refilling of the storage pods.

In accordance with the invention only one free placement area (empty warehouse, platform, etc.) is required, into which the freely stackable rack units are placed and on the floor of which the depositing and retrieving machine(s) and transport unit can travel autonomously between the racks and the picking stations. The capacity and performance can easily be increased and/or adapted if needed by adding or increasing the number of these components without the need for troublesome reconstruction or extension of a fixedly installed structure.

In other words, in accordance with aspects of the invention a goods-storage and order-fulfillment system is provided having a rack store consisting of rack units which can be freely stacked on placement areas, in particular on a floor, platform or other surfaces and which form at least one multi-level rack in a self-supporting manner and provide the rack store, the multi-level rack is designed e.g. as a shelved rack, wherein each shelf is designed as a removable tray which serves to store a plurality of articles; having at least one automated, preferably autonomous, depositing and retrieving machine for depositing and/or retrieving the trays into/out of the shelved racks, which is designed as a floor-bound conveying means with its own travel drive and which is automatically controlled and contactlessly guided; having at least one automated, preferably autonomous, transport unit for receiving or transferring articles from or to the depositing and retrieving machine in order to transport an individual article unloaded from the tray to a picking station or to transfer an individual article to the tray, wherein the transport unit is designed as a floor-bound conveying means with its own travel drive and which is automatically controlled and contactlessly guided; and having at least one picking station which is supplied with individual articles by the transport unit for at least partial order fulfillment on the basis of order data.

There is thus a separation between the storage unit and transport unit, in contrast to the Kiva system. In the Kiva system, the mobile rack or the storage pod is used for both. In contrast, in the present case, the freely stackable rack units are used for storage and the trays are used for transportation. On the one hand, this makes it possible to form much higher racks (by high stacking). The rack units can also be put together at any point (which can also change if required) to form the rack. On the other hand, the trays also carry a plurality of articles at the same time so that a large number of different storage configurations is feasible and the handling of the trays as being removable from the rack is simplified. The depositing and retrieving machine can thus extract (remove) a tray from the rack and then, in a targeted manner after transportation, transfer an individual article, directly or even gathered in a load carrier, to the transport unit for further transportation to the picking station.

Since in this way only one article is transported to the picking station and provided at that location for order fulfillment (picking) at the same time, the picking station can be designed in a substantially more ergonomic manner and therefore render possible an increase in throughput. Since the rack units are not transported, space can be better used by the stacking of the rack units, since in that way substantially higher racks can be formed.

The articles can be stored and transported as such in the system, or can even be present in a known manner in containers, receptacles or cartons etc. or even on separate trays.

The stackable rack units are preferably individual units made from a frame and tray as a shelf for storage of a plurality of articles. In other words, the tray is received in an insertable manner in a self-supporting frame but is a separate component. In one variant, a plurality of trays can be disposed in the same frame, preferably as multi-level units with a plurality of trays as shelves, so that even better stackability is achieved, since fewer tolerance deviations are of any consequence. In particular, the stackable rack units permit the formation of dynamically changeable rack and storage structures so that changes to the rack and storage structures are possible in the course of operation by converting, supplementing, reorganising etc. the rack units. Preferably, the stackable rack units have a constant height spacing and are freely stacked in a tower-like manner disposed next to one another to form variably positionable storage structures with storage racks and aisles.

It is particularly useful if the frames of the stackable rack units are designed so that they can be erected by means of the depositing and retrieving machine or a further movable machine designed only for this purpose (dedicated rack-positioning unit), for which reason handling points are provided, preferably as hollow bars open at the front for engagement by, or as receivers for, load-receivers of the depositing and retrieving machine or the further machine, in particular tines. Therefore, the initial and also the later construction and conversion of the rack and storage structures can be carried out by the depositing and retrieving machine in an automated, and possibly even autonomous, manner, this machine therefore fulfils a plurality of functions.

It is particularly preferred if the automated depositing and retrieving machine has a lifting system with a lifting mast, on which a lifting carriage with a load-receiving device designed as a load-bearing fork is disposed in a vertically movable manner. In other words, the automated depositing and retrieving machine can be designed in the manner of a forklift truck. It is then also possible for the automated depositing and retrieving machine to have a loading and unloading mechanism for targeted unloading/loading of an article from the tray carried by the load-receiving device. For this purpose, the depositing and retrieving machine has an adjustable handling unit, such as a pusher/puller unit, which is preferably disposed above the load-receiving device and is controlled by an image-recognition and processing unit including sensors, which is also disposed at that location.

In order to facilitate the loading and unloading of the rack units with the trays, provision can be made for the trays to have receivers for a load-receiving device and/or apertures for extraction purposes so that they can be handled better. The trays themselves (not to be confused with conventional trays) which form the shelves are planar without a raised edge and comprise hollow profiles as receivers on the lower side, which hollow profiles are orientated in the depth direction of the rack so that a fork-like load-receiving device of the depositing and retrieving machine can insert the tines into the hollow profiles for handling purposes. The trays can also have apertures in the front region facing the passageway, preferably in the corners, in order to enable extraction means to engage at that location. The trays therefore carry a plurality of articles at the same time and can be laden therewith in a variable manner so that good use is made of space.

In accordance with aspects of the invention, the transport unit receives an article from the depositing and retrieving machine and transports same to the at least one picking station. In order to permit simple and, at the same time, variable unloading at that location, it is preferable if the transport unit comprises, as an article-carrying structure, a matrix of vertically orientated and mutually spaced tines (spikes, pins, etc.). The transport unit is preferably designed as an AGV and has no substantially active components apart from a drive and navigation system. The transport unit can have a slip-limiting or friction-increasing coating or liner on the upper side of the tines. The provision of narrow belt conveyors, the narrow belts of which run around the tip or upper side of the tines, would also be feasible.

The picking station itself can be designed to permit manual and/or robot-assisted picking as selected.

The provision of order containers at the picking station for the receipt of articles of an order can likewise be supplied with order containers or discharged thereof by means of the transport unit and/or a separate fixedly-installed conveyor system.

The components interact more or less as follows: The depositing and retrieving machines (or the dedicated rack-positioning unit) put together rack units in a pre-planned manner to form a rack and storage structure in which a plurality of articles (with or without loading aids) are then likewise deposited onto the trays or shelves by means of the depositing and retrieving machines. In the course of operation, a depositing and retrieving machine then removes a tray, on which the desired article is stored, by extracting it from the rack unit or the rack, for which purpose the tines of the load-receiving means of the depositing and retrieving machine engage in the bars. As soon as the tray is located on the depositing and retrieving machine it is lowered if necessary and the desired article is pushed off in a targeted manner by the adjustable handling unit disposed above the load-receiving device onto a transport unit waiting next to it or onto the article-carrying structure thereof (tine matrix). This takes place in a controlled manner e.g. by the image-recognition and processing unit including sensors. In parallel to this, the depositing and retrieving machine can conversely remove and deposit articles from a further transport unit which is likewise waiting. The first transport unit then travels autonomously to the target picking station at which the article is required for order processing. Having arrived at that location, the picker (man or machine) can either pick (remove) the presented article directly from the transport unit and place it into an order container or the article can first be inwardly transferred from the article-carrying structure of the transport unit into the picking station, e.g. if this has an integrated buffer. The transport unit can then move the article back into the store or to another site.

In a corresponding manner, a transport unit can also transport the completed order container away to the store exit or packing area. Alternatively, a completed or partially completed order container can also be brought into the store for intermediate storage by means of a transport unit.

At the picking stations, the order containers themselves can also be provided or discharged by means of a conventional conveyor system (roller conveyor, etc.). It is also feasible to provide order containers (empty or partially picked) by the transport units, wherein containers can be received at central provisioning points.

Of course, in accordance with the invention the rack store can be supplied by means of the transport unit with partial or complete orders, which have been picked at the at least one picking station, for the purpose of buffering and/or consolidating same. These are then conversely transferred to the depositing and retrieving machine. The supply and depositing of replenishments can take place in a corresponding manner. Articles provided from the goods intake can be transported into the storage area by the transport units and at that location received and deposited by the depositing and retrieving machines.

Alternatively, the system in accordance with the invention can also operate without trays. In that case, the articles are stored on fixedly installed shelves of the rack modules and deposited and/or retrieved (without tray removal) in a targeted manner by suitable design of the load-receiving means of the depositing and retrieving machine. In other words, as an alternative, a goods-storage and order-fulfillment system is provided, having a rack store consisting of rack units which can be freely stacked on placement areas, in particular on a floor, platform or other surfaces and which form at least one multi-level rack in a self-supporting manner and provide the rack store, the multi-level rack is designed as a shelved rack, wherein each shelf is designed to serve to store a plurality of articles; having at least one automated, preferably autonomous, depositing and retrieving machine for depositing and/or retrieving the articles into/out of the shelved racks, which is designed as a floor-bound conveying means with its own travel drive and which is automatically controlled and contactlessly guided; having at least one automated, preferably autonomous, transport unit for receiving or transferring articles from or to the depositing and retrieving machine in order to transport an unloaded individual article to a picking station or to transfer an individual article to the depositing and retrieving machine, wherein the transport unit is designed as a floor-bound conveying means with its own travel drive and which is automatically controlled and contactlessly guided; and having at least one picking station which is supplied with individual articles by the transport unit for at least partial order fulfillment on the basis of order data.

Further details of the invention will become clear from the following description of exemplified embodiments by reference to the accompanying drawings.

BRIEF DESCRIPTION OF THE DRAWINGS

FIG. 5 shows schematic perspective views of trays of the freely stackable rack units of FIGS. 3 and 4;

FIG. 6 shows schematic perspective views of a depositing and retrieving machine of FIG. 1;

DETAILED DESCRIPTION OF THE PREFERRED EMBODIMENTS

Figure 1:
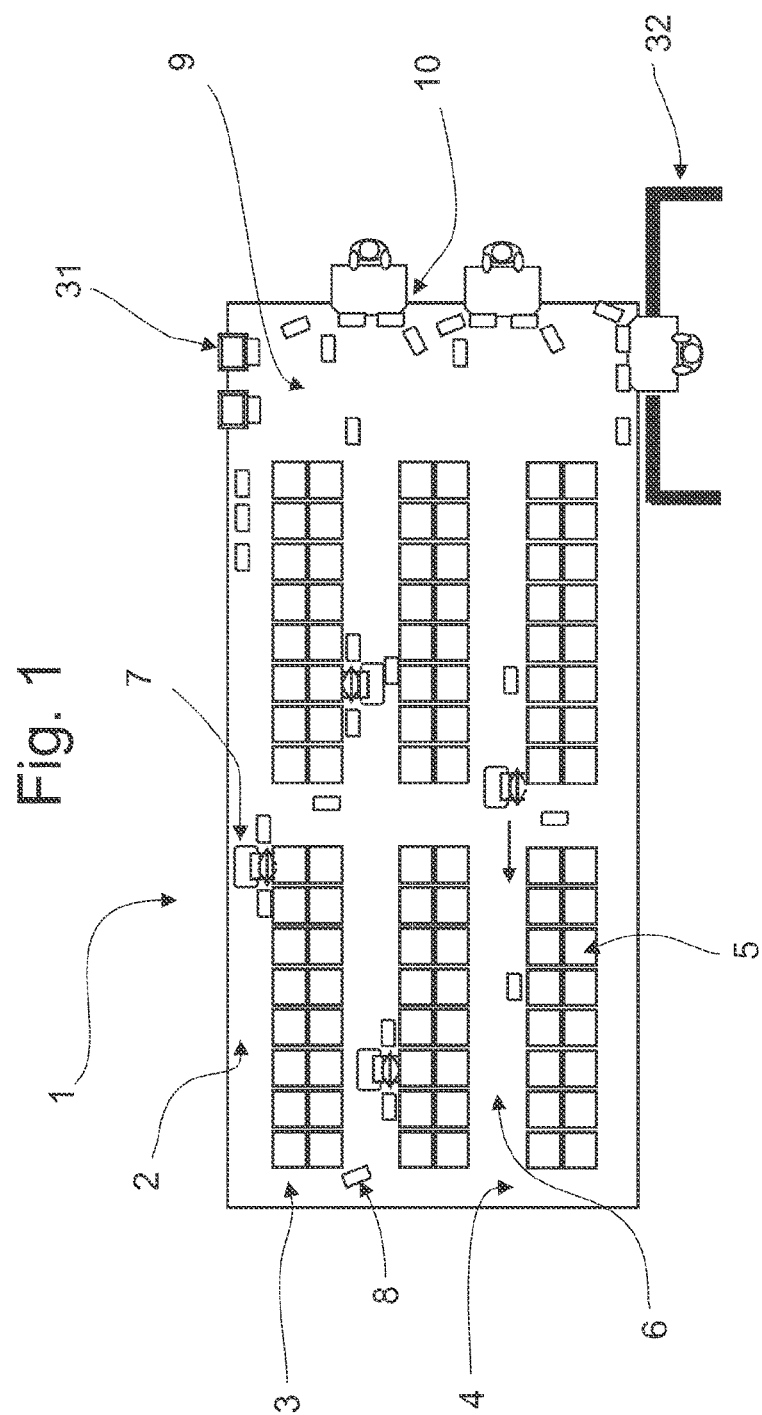
FIG. 1 shows a schematic plan view of a goods-storage and order-fulfillment system according to an aspect of the invention.

The figures show a goods-storage and order-fulfillment system designated as a whole by 1. The goods-storage and order-fulfillment system 1 comprises a storage area 2 with a rack store 3 consisting of racks 5 freely disposed on the warehouse floor 4 and separated from each other by aisles 6. The racks 5 stand back to back in the conventional manner. Autonomous depositing and retrieving machines 7 travel in the aisles 6 to deposit and/or retrieve articles into and/or out of the racks 5. Autonomous transport units 8 also travel in the aisles 6 to receive or transfer articles from or to the depositing and retrieving machines 7. However, the autonomous transport units 8 also travel outside the storage area 2 or rack store 3 into an order fulfillment area 9 in which manual picking stations 10 are disposed.

Figure 2:
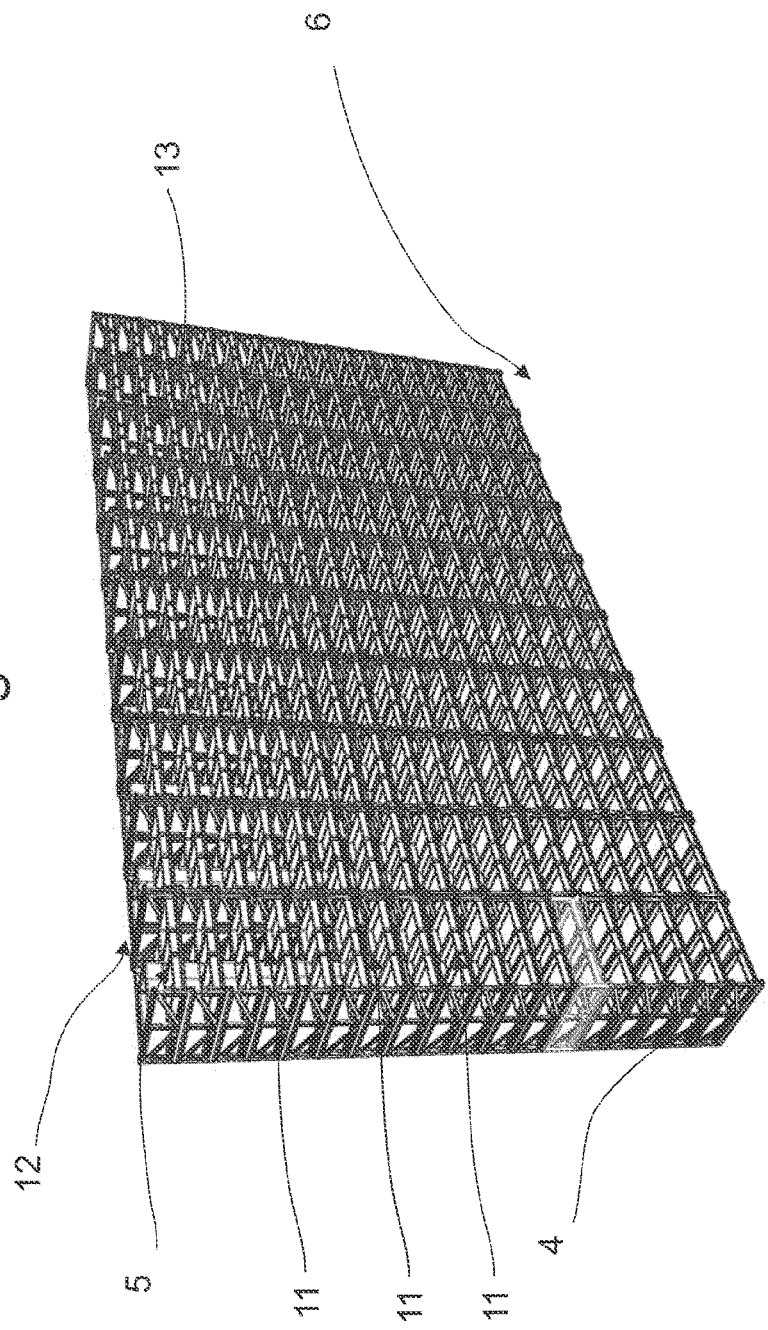
FIG. 2 shows a schematic perspective view of a part of a rack of FIG. 1 made of freely stackable rack units.
Figure 3:
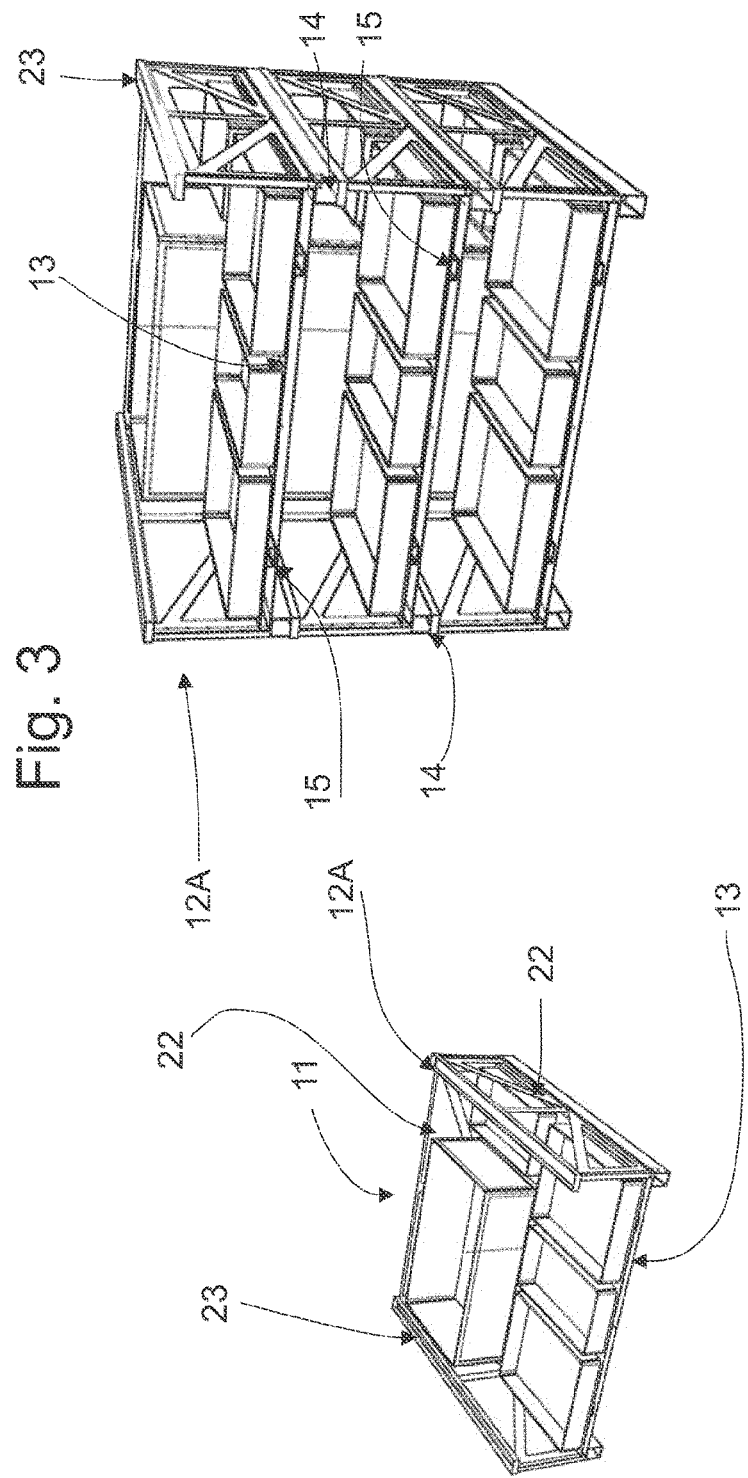
FIG. 3 shows schematic perspective views of parts of the freely stackable rack units of FIG. 2.
Figure 4:
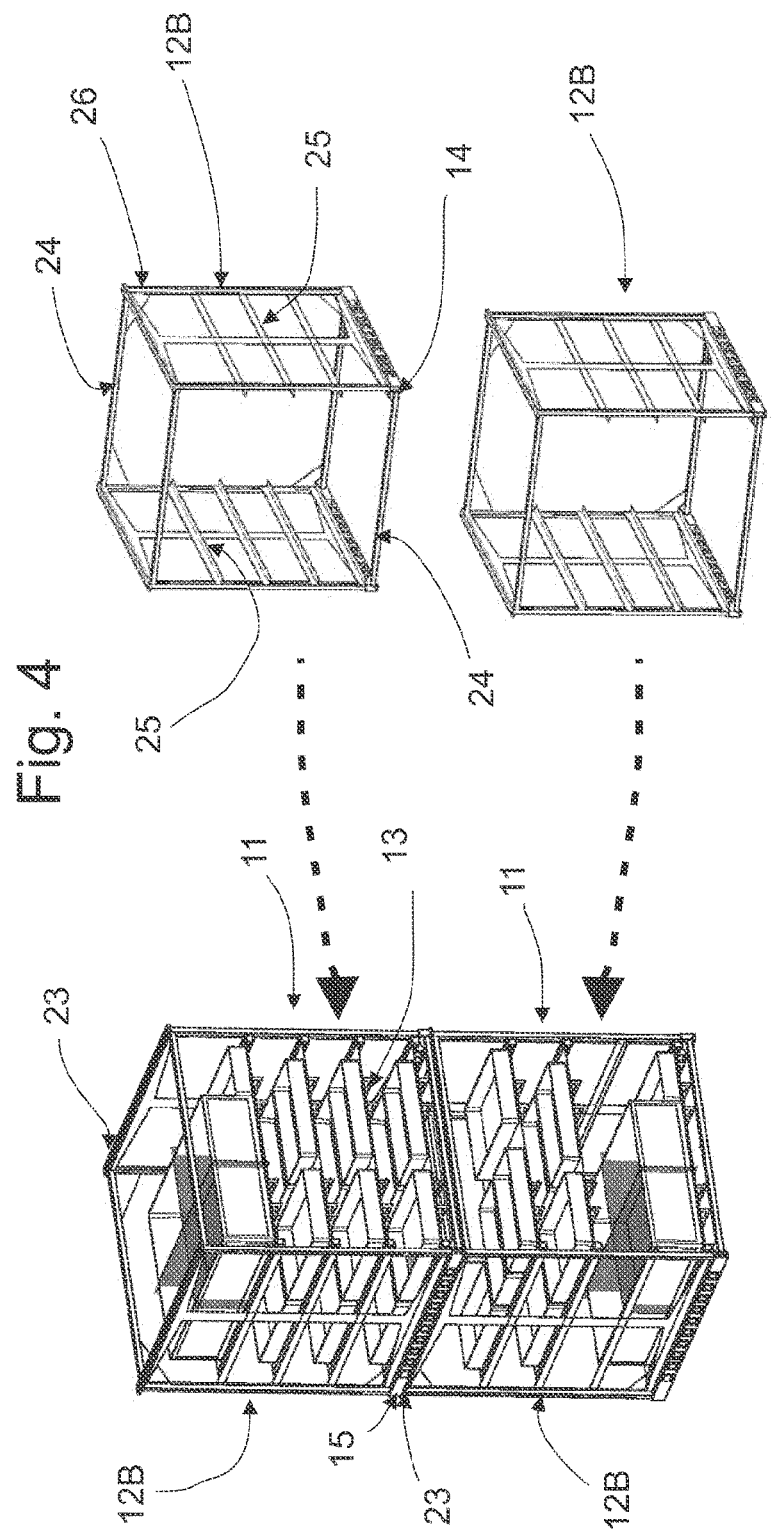
FIG. 4 shows schematic perspective views of alternative parts of the freely stackable rack units of FIG. 2.
Figure 7:
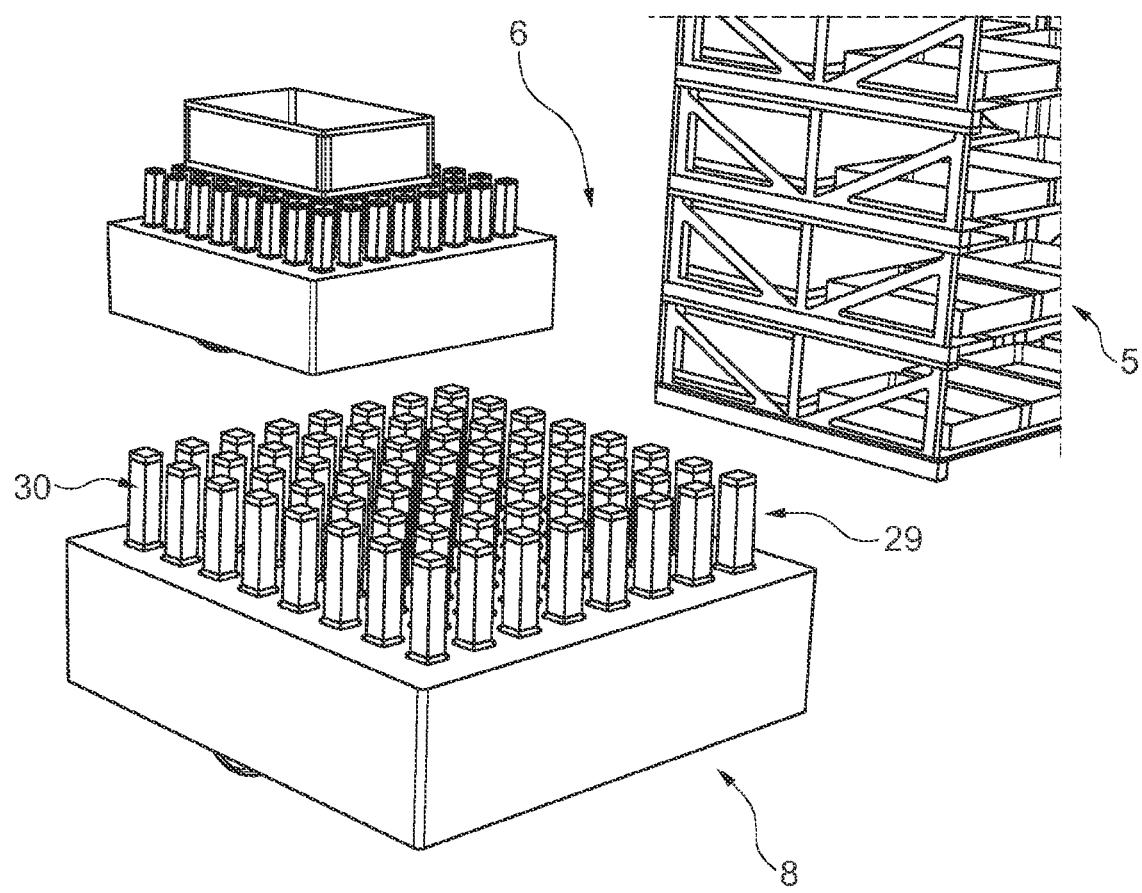
FIG. 7 shows a schematic perspective view of an autonomous transport unit of FIG. 1.

The racks 5 consist of freely stackable rack units 11 which, being stacked on and next to each other, form the multi-level racks 5 as shelved racks in a self-supporting manner (FIG. 2). The freely stackable rack units 11 comprise a frame 12 and, as shelves, at least one removable tray 13 which serves to store a plurality of articles. The rack units 11 are thus individual units consisting of a single-level frame 12A and tray 13 as a shelf (FIG. 3) for storing a plurality of articles or are designed as multi-level frames 12B (FIG. 4) with a plurality of trays 13 as shelves.

The single-level frames 12A each comprise latticework-like side and rear walls 22 which, on the one hand, provide a stiffened support structure and, on the other hand, have rail-like placement areas 23 on their upper side for the stacking of further frames (via the hollow bars 14, see below) thereon. The hollow bars 14 protrude inwards and thus at the same time form bearing compartments for the respective tray 13.

In contrast to this, the multi-level frames 12B, which thus receive a plurality of shelves or trays 13 in one frame, can comprise a plurality of stiffening transverse bars 24 and tray bearers 25 in a cuboidal stand 26. The high level of inherent precision thus permits greater stacking heights to be achieved with relatively small divergences as there is no cumulative effect of tolerances. The frames 12 are freely stacked or stood in a tower-like manner on the warehouse floor 4 by means of the depositing and retrieving machines 4 in order to form the desired store 3. The arrangement can thus be changed—depending on requirements—in a dynamic and variable manner. In order to make it possible for the frames 12 to be handled by the depositing and retrieving machines 7, the frames 12 have handling points 14 in the form of hollow bars 14 which are open at the front. The respective depositing and retrieving machine 7 can engage therein with tines 20 of the load-receiving means 19.

The autonomous depositing and retrieving machines 7 are also designed to deposit and retrieve the trays 13 with the articles thereon into and out of the shelved racks 5. For this purpose, the trays 13 also have, on the lower side, handling points 15 in the form of the hollow bars (at a smaller spacing) which are open at the front. The respective depositing and retrieving machine 7 can also engage therein with the width-adjustable tines 20 of the load-receiving means 19.

As shown in FIG. 5, the trays 13 have a flat upper side 27 for the storage of a plurality of articles. On the lower side, the hollow bars 15 are disposed spaced apart. Each tray 13 thus forms a shelf when it is pushed into a frame, on which a plurality of articles (containers, cartons, packages, individual articles, etc.) are stored. The tray 13 can also be provided with segmented containers 28.

The autonomous depositing and retrieving machines 7 are designed as floor-bound conveying means with their own travel drive and are automatically controlled and contactlessly guided as is known analogously from AGVs (automated guided vehicles) or AMRs (autonomous mobile robots). Each autonomous depositing and retrieving machine 7 has a lifting system 16 with a lifting mast 17 on which a lifting carriage 18 with a load-receiving device designed as a load-bearing fork 19 is disposed in a vertically movable manner. By means of the width-adjustable tines 20 of the load-bearing fork 19 the trays 13 or the frames 12 are moved, as mentioned, by engagement into the hollow bars 14 or 15.

The load-bearing fork 19 also comprises a loading and unloading mechanism 21 for targeted unloading/loading of an article from a carried tray 13. The two tines 20, which are spaced in an adjustable manner, are equally able to receive the frame stand 12 or the tray 13.

The handling unit as a pusher/puller unit 21 with a plurality of individually activatable vertical pushing plates 35 is located above the tines 20 in order to handle articles in a targeted manner. For this purpose, by means of a movement of the whole unit, the pushing plates 35 are lowered until they are able to push off the desired article. Pushing plates that are not required are positioned outwardly on the far side of the tray surface.

The respectively handled article is transferred to an autonomous transport unit 8 (AMR) which, in order to carry an individual article unloaded from the tray 13 on the load-bearing fork 19, comprises an article-carrying structure as a matrix 29 consisting of vertically orientated and mutually spaced tines 30. The autonomous transport unit 8 is likewise designed as a floor-bound conveying means with its own travel drive and is automatically controlled and contactlessly guided. The autonomous transport unit 8 supplies and discharges from the depositing and retrieving machines 7 in the store 3 and also the picking stations 10 in the order fulfillment area 9. The picking stations 10 are thus supplied with individual articles by the transport units 8 for at least partial order fulfillment on the basis of order data. In the simplest case, the transport unit 8 simply presents the container with the content. Alternatively, the containers or articles can also be unloaded from the transport unit 11 at the picking station 10. Partially filled order containers can be transported further to the next picking station 10 and completed order containers can be transported away.

In addition, the autonomous transport unit 8 can also supply the picking stations 10 with (empty or partially filled) order containers and discharge them of same. For this purpose, stations 31 can be provided, at which order containers are output to the autonomous transport units 8 and completed order containers are also removed therefrom.

The rack store 3 can also be supplied by means of the transport unit 11 in a corresponding manner by partial or completed orders, which have been picked at the at least one picking station 10, for the purpose of buffering and/or consolidating same.

The picking stations 10 themselves are designed to permit manual and/or robot-assisted picking as selected. Alternatively or additionally, they can be supplied with order containers and/or discharged of same by means of a separate fixedly installed conveyor system 32.

Figure 8:
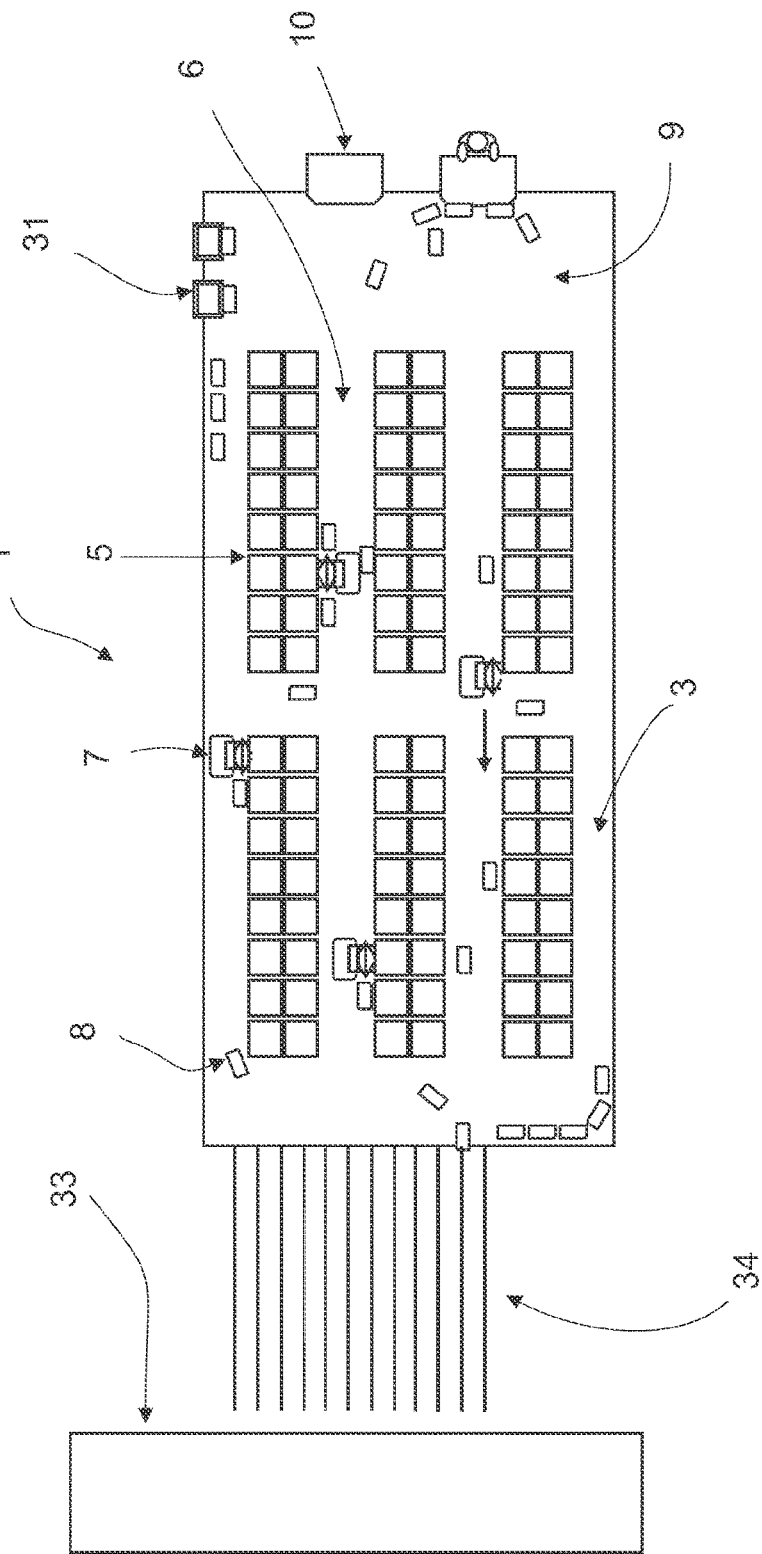
FIG. 8 shows a schematic plan view of the goods-storage and order-fulfillment system of FIG. 1 with an attached goods intake area.

Articles for replenishment can be provided from a central goods intake 33 via accumulating roller conveyors 34 (FIG. 8), which articles are received by the autonomous transport units 8 and transported into the rack store 3 to depositing and retrieving machines 7 waiting there. At that location, these are received by the depositing and retrieving machines 7 and deposited with the trays 13.

The invention claimed is:

1. A goods-storage and order-fulfillment system comprising:
   a rack store comprising rack units that can be freely stacked on placement areas and which form at least one multi-level rack in a self-supporting manner and provide the rack store, wherein the multi-level rack is configured as a shelved rack, and wherein each shelf is designed as a removable tray that serves to store a plurality of articles;
   at least one automated depositing and retrieving machine configured as a floor-bound conveying device having its own travel drive and being automatically controlled and contactlessly guided, wherein the at least one automated depositing and retrieving machine is operable to deposit and/or retrieve trays into/out of the shelved racks;
   at least one automated transport unit that is operable to receive or transfer articles from or to the depositing and retrieving machine in order to transport an individual article unloaded from the tray to a picking station or to transfer an individual article to the tray, wherein the transport unit is configured as a floor-bound conveying device having its own travel drive and being automatically controlled and contactlessly guided; and
   at least one picking station that is supplied with individual articles by the transport unit for at least partial order fulfillment on the basis of order data;
   wherein the stackable rack units are individual units consisting of a frame and tray as a shelf for storage of a plurality of articles.

2. The goods-storage and order-fulfillment system as claimed in claim 1, wherein the stackable rack units permit the formation of dynamically changeable rack and storage structures.

3. The goods-storage and order-fulfillment system as claimed in claimed in claim 2, wherein the stackable rack units comprise a constant height spacing and are freely stacked in a tower-like manner disposed next to one another to form variably positionable storage structures with storage racks and aisles.

4. The goods-storage and order-fulfillment system as claimed in claim 2, wherein the frames of the stackable rack units are designed so that they can be erected by means of the depositing and retrieving machine or a further movable machine designed only for this purpose, for which reason handling points are provided as receivers for tines of the depositing and retrieving machine or the further machine.

5. The goods-storage and order-fulfillment system as claimed in claim 2, wherein the automated depositing and retrieving machine has a lifting system comprising a lifting mast on which a lifting carriage with a load-receiving device designed as a load-bearing fork is disposed in a vertically movable manner.

6. The goods-storage and order-fulfillment system as claimed in claim 5, wherein the automated depositing and retrieving machine has a loading and unloading mechanism for targeted unloading/loading of an article from the tray carried by the load-receiving device.

7. The goods-storage and order-fulfillment system as claimed in claim 1, wherein the trays comprise receivers for a load-receiving device and/or apertures for extraction purposes.

8. The goods-storage and order-fulfillment system as claimed in claim 1, wherein the transport unit comprises, as an article-carrying structure, a matrix of vertically orientated and mutually spaced tines.

9. The goods-storage and order-fulfillment system as claimed in claim 1, wherein the picking station is designed to permit manual and/or robot-assisted picking as selected.

10. The goods-storage and order-fulfillment system as claimed in claim 9, wherein the picking station is supplied with order containers or discharged thereof by the transport unit and/or a separate fixedly-installed conveyor system.

11. The goods-storage and order-fulfillment system as claimed in claim 1, wherein the rack store is supplied via the transport unit by partial or complete orders, which have been picked at the at least one picking station, for the purpose of buffering and/or consolidating same.

12. The goods-storage and order-fulfillment system as claimed in claim 1, wherein the at least one automated depositing and retrieving machine comprises an autonomous automated depositing and retrieving machine, and wherein the at least one automated transport unit comprises an autonomous transport unit.

13. The goods-storage and order-fulfillment system as claimed in claim 1, wherein the stackable rack units permit the formation of dynamically changeable rack and storage structures.

14. The goods-storage and order-fulfillment system as claimed in claimed in claim 1, wherein the stackable rack units comprise a constant height spacing and are freely stacked in a tower-like manner disposed next to one another to form variably positionable storage structures with storage racks and aisles.

15. The goods-storage and order-fulfillment system as claimed in claim 1, wherein the frames of the stackable rack units are designed so that they can be erected by means of the depositing and retrieving machine or a further movable machine designed only for this purpose, for which reason handling points are provided as receivers for tines of the depositing and retrieving machine or the further machine.

16. The goods-storage and order-fulfillment system as claimed in claim 1, wherein the automated depositing and retrieving machine has a lifting system comprising a lifting mast on which a lifting carriage with a load-receiving device designed as a load-bearing fork is disposed in a vertically movable manner.

17. The goods-storage and order-fulfillment system as claimed in claim 16, wherein the automated depositing and retrieving machine has a loading and unloading mechanism for targeted unloading/loading of an article from the tray carried by the load-receiving device.

18. A goods-storage and order-fulfillment system comprising:
   a rack store consisting of rack units which can be freely stacked on placement areas, and which form at least one multi-level rack in a self-supporting manner and provide the rack store, wherein the multi-level rack is configured as a shelved rack, and wherein each shelf is designed to serve to store a plurality of articles;
   at least one automated depositing and retrieving machine configured as a floor-bound conveying device having its own travel drive and being automatically controlled and contactlessly guided, wherein the at least one automated depositing and retrieving machine is operable to deposit and/or retrieve trays into/out of the shelved racks;
   at least one automated transport unit that is operable to receive or transfer articles from or to the depositing and retrieving machine in order to transport an unloaded individual article to a picking station or to transfer an individual article to the depositing and retrieving machine, wherein the transport unit is configured as a floor-bound conveying device having its own travel drive and being automatically controlled and contactlessly guided; and
   having at least one picking station that is supplied with individual articles by the transport unit for at least partial order fulfillment on the basis of order data;
   wherein the stackable rack units are individual units consisting of a frame and tray as a shelf for storage of a plurality of articles.

19. A goods-storage and order-fulfillment system comprising:
   a rack store comprising rack units that can be freely stacked on placement areas and which form at least one multi-level rack in a self-supporting manner and provide the rack store, wherein the multi-level rack is configured as a shelved rack, and wherein each shelf is designed as a removable tray that serves to store a plurality of articles;
   at least one automated depositing and retrieving machine configured as a floor-bound conveying device having its own travel drive and being automatically controlled and contactlessly guided, wherein the at least one automated depositing and retrieving machine is operable to deposit and/or retrieve trays into/out of the shelved racks;
   at least one automated transport unit that is operable to receive or transfer articles from or to the depositing and retrieving machine in order to transport an individual article unloaded from the tray to a picking station or to transfer an individual article to the tray, wherein the transport unit is configured as a floor-bound conveying device having its own travel drive and being automatically controlled and contactlessly guided; and at least one picking station that is supplied with individual articles by the transport unit for at least partial order fulfillment on the basis of order data;

wherein the stackable rack units permit the formation of dynamically changeable rack and storage structures.

20. The goods-storage and order-fulfillment system as claimed in claim 19, wherein the stackable rack units comprise a constant height spacing and are freely stacked in a tower-like manner disposed next to one another to form variably positionable storage structures with storage racks and aisles.

* * * * *